April 20, 1965   J. R. ROCHESTER ETAL   3,178,939
SYSTEM FOR MEASURING FLIGHT VARIABLES OF HYPERSONIC VEHICLE
Filed May 24, 1962                       2 Sheets-Sheet 1
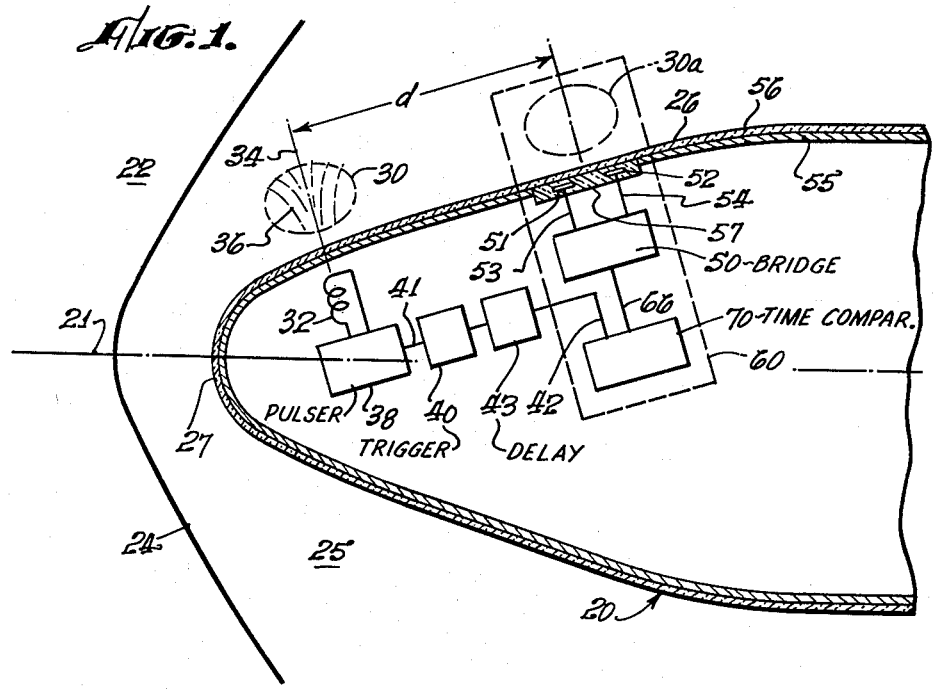
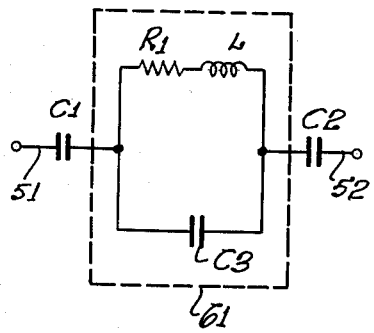
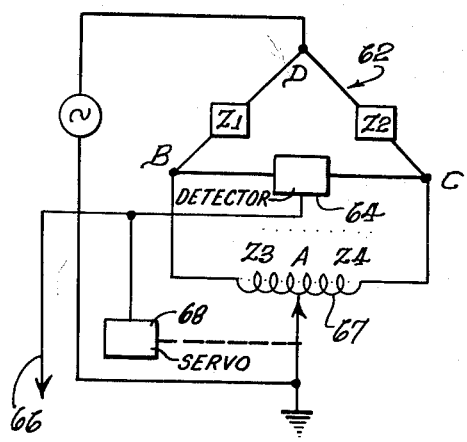
INVENTORS.
JAMES R. ROCHESTER,
ALEXANDER J. MONCRIEFF-YEATES,
HENRY DOELEMAN,
THOMAS J. HARRIMAN,
BY Barlee + Lewis

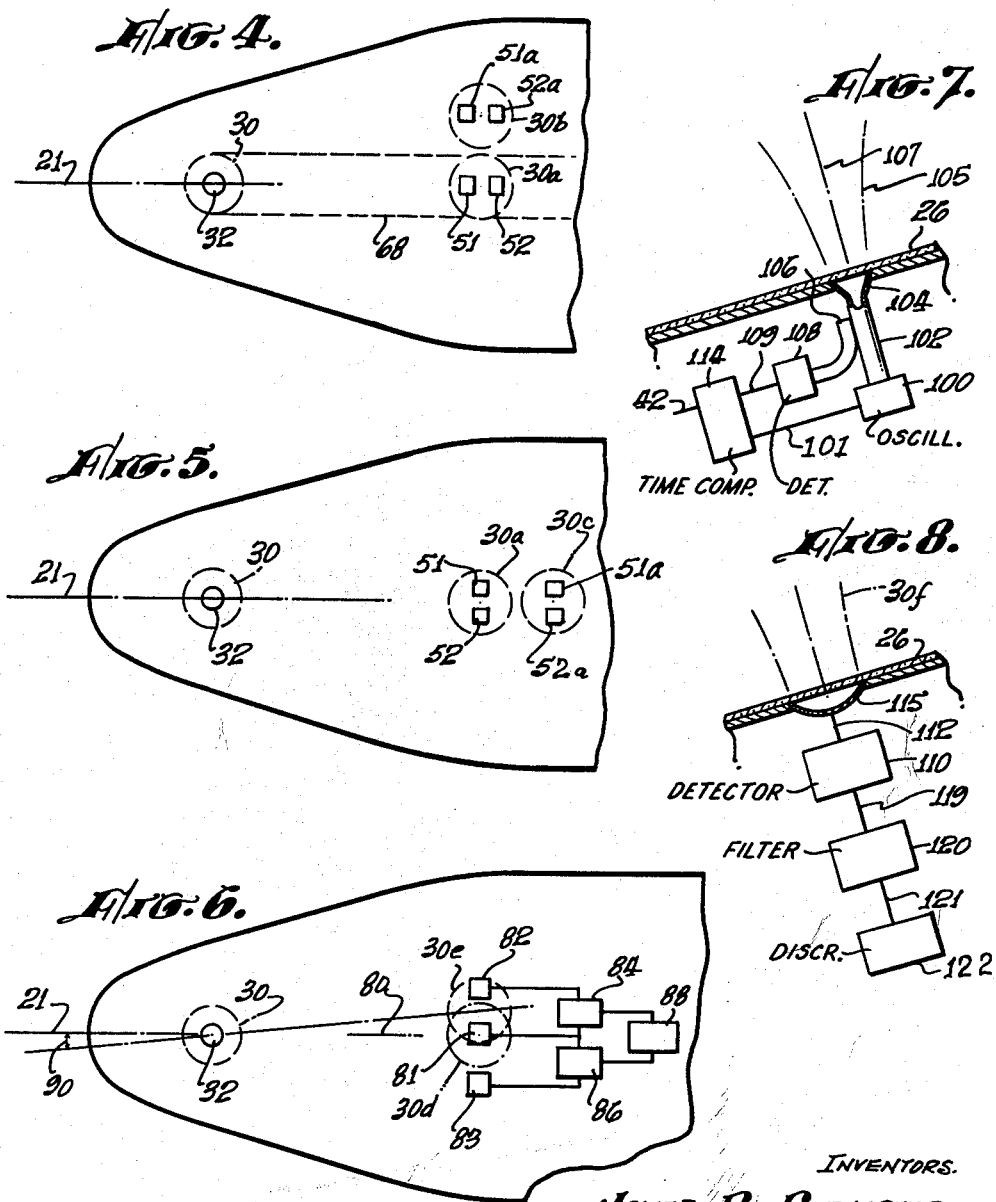

United States Patent Office 3,178,939
Patented Apr. 20, 1965

3,178,939
SYSTEM FOR MEASURING FLIGHT VARIABLES OF HYPERSONIC VEHICLE
James R. Rochester, San Gabriel, Alexander J. Moncrieff-Yeates, Altadena, Henry Doeleman, Glendora, and Thomas J. Harriman, Pasadena, Calif., assignors to Giannini Controls Corporation, Duarte, County of Los Angeles, Calif., a corporation of New York
Filed May 24, 1962, Ser. No. 197,345
6 Claims. (Cl. 73—180)

This invention has to do with the measurement of flight variables of a vehicle moving throught a gaseous medium at hypersonic velocity, that is, at velocity appreciably greater than that of sound in the medium.

At hypersonic velocities conventional instruments for measuring such flight variables as velocity and angle of attack are rendered unsatisfactory or useless by the shock waves in the medium and by the heat produced at the surface of the vehicle.

It has previously been suggested to overcome those difficulties by making direct measurements of the angle of the primary shock wave formed in advance of the vehicle nose. Reflection of electromagnetic radiation from the shock front provides one means of making such measurements, as described in United States Patent No. 2,937,808, issued to William H. Newell. It has further been suggested to periodically displace the shock front, as by means of a variable magnetic field produced in the region of the shock front directly in front of the vehicle, and measure the propagation of the perturbations. Systems for measuring flight variables in that way are described and claimed in patent application Serial No. 39,171, filed on June 27, 1960 by Robert R. Berlot and assigned to the same assignee as the present application.

We have discovered, however, that direct measurement of the position or angle of the shock front is rendered difficult by rapid absorption of electromagnetic radiation in the region of intense ionization that exists behind the shock front.

The present invention avoids that difficulty by operating on and observing the region of dense ionization between the vehicle and the shock front. The invention thereby overcomes all difficulties associated with deep penetration into such an ionized layer.

We have discovered that it is possible to perturb the ion distribution in a region of the plasma adjacent the vehicle surface. In accordance with the invention, the resulting perturbations in the ion density are observed at one or more selected points downstream of the region of perturbation. The plasma perturbations may be produced in any suitable manner, as by intermittent magnetic or electric fields.

In accordance with one aspect of the invention, the magnitude of the drift velocity of the ion perturbations is determined, for example from the difference in time at which a given perturbation occurs at two longitudinally spaced stations, one of which may be the origin of the perturbation. That drift velocity is ordinarily proportional to the vehicle velocity, although not directly equal to it, and provides a useful measure of variations of that quantity.

In accordance with a further aspect of the invention, the means for sensing perturbations in the ion density surrounding the vehicle are so arranged as to provide a measure of the direction of the drift velocity over the vehicle surface. That direction provides useful information about the angle of attack of the vehicle.

In accordance with the broader aspects of the invention, the ion perturbations may be sensed by any convenient method. For example, a beam of electromagnetic radiation may be projected transversely from the vehicle at a definite longitudinal station, and the radiation intensity reflected from the ionized medium may be continuously monitored. Perturbations in the density of ionization of the medium then appear as variations in the intensity of the reflected radiation. By providing two axially spaced sensing stations of that type, the difference in time of arrival of a particular perturbation at the two stations can be accurately indicated by timing circuitry of conventional type.

A particular advantage of the present invention is the fact that the ion perturbations can be effectively sensed by essentially passive apparatus. A particularly satisfactory sensing means of passive type comprises a plurality of electrodes mounted closely adjacent the vehicle surface in mutually insulated relation and in capacitative relation to the electric charge present in the surrounding ionized gaseous medium or plasma. The effective capacitance between two such spaced insulated plates is monitored, providing a sensitive measure of any variations in the electron density in the adjacent plasma. Extremely accurate and rapid measurement of that capacitance may be accomplished, for example, by means of a double ratio capacitance bridge such as that developed by Blumlein and described by H. A. M. Clarke and P. B. Vanderlyn in Institute of Electrical Engineers Proceedings, Part 3, page 96, May 3, 1959. For the purposes of the present invention, it is preferred to energize such a bridge with alternating current of relatively high frequency, typically in the region of 1 to 10 mc., rather than the region of 5 kc. described in the cited article. This requires only modifications and refinements of the described technique in accordance with known principles of electrical engineering.

A further type of sensing device that may be utilized in accordance with the invention comprises a resonant circuit in which the reactance involves electromagnetic lines of force that extend outside of the vehicle into the surrounding plasma. Such characteristics as the natural frequency and Q of the resonant circuit then vary in response to changes in the electron density in the plasma. Extremely sensitive techniques are available for observing such variations.

A further aspect of the invention provides detection of perturbations in the ion density of the plasma surrounding a vehicle by observing the electromagnetic radiation emitted by the plasma itself. Such radiation, frequently referred to as noise because of its wide frequency distribution, is picked up by suitable local antenna means and measured by radar or microwave detection devices which may be of conventional design. Variations in the measured noise level or spectrum then indicate passage of the plasma perturbation by the sensing station.

A full understanding of the invention and of its further objects and advantages will be had from the following description of certain illustrative manners of carrying it out. The particulars of that description, and of the accompanying drawings which form a part of it, are intended only as illustration, and not as a limitation upon the scope of the invention, which is defined in the appended claims.

In the drawings:

FIG. 1 is a schematic axial section representing the forward portion of an illustrative hypersonic vehicle embodying the invention;

FIG. 2 is a fragmentary schematic diagram representing an equivalent circuit illustrating one aspect of the invention;

FIG. 3 is a schematic diagram representing an illustrative bridge circuit in accordance with the invention;

FIG. 4 is a fragmentary schematic elevation illustrating a further aspect of the invention;

FIG. 5 is a fragmentary schematic elevation representing a modification;

FIG. 6 is a fragmentary schematic elevation representing a further aspect of the invention;

FIG. 7 is a fragmentary schematic axial section representing a further aspect of the invention; and FIG. 8 is a fragmentary schematic axial section representing a modification.

FIG. 1 represents schematically at 20 the nose section of a vehicle, typically a missile, moving at hypersonic velocity to the left along its axis of symmetry 21 through a gaseous medium indicated at 22. The usual vehicle shock wave is indicated schematically at 24. The region between that shock wave and the vehicle, indicated at 25, is typically highly ionized, the exact degree of ionization varying with such factors as the vehicle shape and velocity and the density and temperature of the medium. The degree of ionization is also a function of radial distance from the vehicle surface 26 and longitudinal position, measured, for example, from the vehicle nose 27. Because of the complex dependence of the ionization density upon such factors, it is very difficult to derive useful information from direct measurements of the magnitude of the ion density under any particular conditions.

In accordance with the present invention, however, the ion density at a particular region is caused to vary in some predetermined manner, referred to herein as a perturbation. Such perturbation may be produced by means of an intermittent magnetic or electric field that extends from the vehicle into the desired region of the surrounding plasma. For example, a sharply defined perturbation of the ion density may be produced by means of an arc discharge between two spaced electrodes set into the surface of the vehicle. Very brief voltage pulses may be supplied to such electrodes by circuit means of conventional type, such as are employed to energize gas discharge lamps for flash photography.

Effective local perturbation of the surrounding plasma can be produced without exposure of any metallic electrode surface. For example, a perturbing magnetic field may be produced by passing a current pulse through a helical winding that is mounted within the vehicle adjacent the vehicle surface and with the coil axis transverse of that surface.

Such a coil is indicated schematically in FIG. 1 at 32 with its coil axis 34 generally perpendicular to the vehicle surface. Electrical current pulses are supplied to coil 32 from the power and pulsing means indicated schematically at 38 in response to a keying signal received via the line 41 from the trigger means 40. That trigger means and pulsing device 38 are typically of conventional construction. The magnetic flux lines 36 from such a coil project outward from the vehicle surface into the region indicated schematically at 30, the size of the region in which effective perturbation occurs being controllable by selection of the dimensions and form of the winding. A coil diameter of a few centimeters is typical. A coil of a few turns with air or ferrite core can be pulsed intermittently with an effective pulse duration of the order of 1 microsecond.

We have determined experimentally that the presence of such a magnetic field produces readily measurable changes in the distribution of electric charges in a plasma, thereby causing local variations in the charge density. We have determined, for example, that a magnetic field of 100 gauss, in the form a pulse with the relatively long duration of 200 miscroseconds causes a local bunching of electrons and ions, reducing their downstream concentration and distribution. Results indicated an ion density modulation, due to presence of the magnetic field, of at least one order of magnitude. The experimental plasma beam used to simulate ionized flow in the shock layer had a density of $10^8$ ions/cm.$^3$, and had a mean velocity of $5 \times 10^6$ cm. sec. (150,000 f.p.s.), considerably higher than most practical vehicle velocities. The ion densities employed correspond to those which would be encountered in hypervelocity flow at an altitude of about 120 km. (360,000 ft.). With the higher ion densities expected at lower altitudes further down the reentry corridor, the method should be at least equally effective. Ion density variations are also obtainable in response to pulses of magnetic field as brief as 1 microsecond. The dynamic inductive action of the field variations is believed to produce the predominant perturbing action in the case of short pulses, while the primary effect of a steady field is to alter the relative mobility of the positive and negative ions and thereby change their distribution.

Plasma density perturbations of the described type are found to persist in detectable form for times at least of the order of $10^{-4}$ second. For a typical vehicle velocity of the order of $10^6$ cm. per second (30,000 feet per second), that minimum persistence corresponds to a vehicle displacement of 100 cm. It is to be kept in mind, however, that the plasma drift velocity adjacent the vehicle surface is typically of the order of half of the vehicle velocity, due to action of the shock wave; and at altitudes lower than 120 km. the higher atmospheric density may be expected to reduce the time of persistence of the perturbations. Hence the perturbation may not under all conditions retain its identity for a drift distance as great as 100 cm.

In accordance with the invention, a suitable sensing device 60 is provided that is responsive to variations in ion density in a region such as is indicated at 30a, directly downstream of the perturbation region 30. Such a sensing device is represented illustratively in FIG. 1 as a pair of electrode plates 51 and 52 embedded in a dielectric window structure 57 which is set into the outer metallic skin 55 of the vehicle. The vehicle is represented as being coated with a layer 56 of heat resistant material having the characteristics of a dielectric ceramic. That ceramic coating may also cover the window 57. In fact, although the window is represented as being distinct from the coating layer, it may comprise simply a local area of the coating layer of suitable thickness. The plates are typically, although not necessarily, parallel to vehicle surface 26 and as close to that surface as is practicable. The plates are mutually spaced parallel to the surface in a direction that may be selected with due regard for the desired response. Substantially axial spacing is represented in FIGS. 1 and 4; transverse spacing in FIGS. 5 and 6.

The plates 51 and 52 are electrically connected via the respective leads 53 and 54 to a suitable discriminating device, represented schematically at 50, which is responsive to changes in effective mutual capacitance between them. The equivalent circuit between the conductive plates 51 and 52 may be represented as in FIG. 2. If the plasma adjacent the surface of the vehicle is first assumed to be infinitely conductive, the equivalent circuit comprises two capacitances C1 and C2 in series, the value of each corresponding to the plate area and to the dielectric constant and thickness of the dielectric layer between the plate and the conductive plasma. However, at the ion densities commonly encountered, for example in the upper half of the reentry corridor, the conductivity of the plasma is limited and depends directly upon the charge density. The effect of the limited conductivity of the plasma under such conditions is represented by the box 61 in FIG. 2. The capacitance C3 corresponds to the capacitance that would exist for un-ionized air between plates at the vehicle surface directly over the actual plates 51 and 52. The resistance R1 represents the resistance that the actual plasma would present between such plates under steady state conditions. C3 is typically extremely small and may be neglected; and if measurements are made at high-frequency R1 is also negligible.

The inductance L in FIG. 2 represents the equivalent inductance introduced between the plates 51 and 52 by the limited conductivity of the plasma, which is due mainly to the electron mobility, when a high-frequency alternating current potential is applied to the plates. The frequency is preferably sufficiently high that the resulting electron movements during each cycle are small compared to the mean free path in the medium. For example, a frequency of the order of 1 megacycle per second is suitable under most practical conditions.

Dimensions such as the plate areas and mutual spacing are selected with due regard for known laws of electromagnetic theory. As an illustration, with plate area of about 1 cm.$^2$ and spacing of about 10 cm., the overall impedance between lines 53 and 54 is found to be typically less than a megohm and made up largely of the inductance component L, so that any change in electron density in the plasma modulates the impedance with high sensitivity. For a perturbation region having an illustrative diameter of 5 cm. and a drift velocity of one half the vehicle velocity of $10^6$ cm. per sec., for example, the effective transit time past such a detector with electrodes spaced transversely is of the order of 10 microsec. Smaller transit times are obtainable with more closely spaced electrodes and smaller regions of perturbation, provided the drift distance is short enough to prevent excessive diffusion of the perturbation.

The detection device indicated at 50 typically comprises a double ratio capacitance bridge such as that described in the literature reference already identified. Such a bridge is indicated schematically at 62 in FIG. 3. The electrode pair 51, 52 forms an impedance element which is designated Z1. This is connected in a bridge with a similar impedance element Z2, and the bridge is balanced by adjustment of the impedance elements Z3 and Z4. The latter are provided as close-coupled inductive elements 67 of low resistance. High frequency power is applied at A and at D. Because the currents from A to B and to C flow in opposite sense in a common winding, there is very little voltage drop from A to B and C. Hence B and C are nearly at the potential of A, which is grounded, and stray capacitances between points B and C and ground become negligible. On the other hand, the impedance of the whole inductor 67 from B to C presents high shunting impedance to the detector 64, connected between B and C. Hence, with this type of bridge when properly constructed and operated, the effect of stray capacitances is largely eliminated even at the high frequency required for resolution and matching of the plasma impedance to other impedances in the circuit.

Any lack of balance of the bridge 62 produces a corresponding signal from detector 64. That signal is supplied as output signal via the line 66, and is preferably also supplied to a servo balancing mechanism indicated schematically at 68. Device 68 automatically drives the balance adjustment of the bridge, shown schematically as the point of application of input power to winding Z3, Z4. The time constant of drive device 68 is preferably such as to correct normally occurring departures from balance but to be essentially non-responsive to departures from balance that result from rapid perturbations of the plasma density produced in region 30. For example, if such perturbations are produced by current pulses in winding 32 having a duration of the order of one to ten microseconds, the bridge typically becomes unbalanced for a time of that same order as the perturbation passes in front of the detecting station. Such unbalance will appear substantially in full at output line 66. On the other hand, as the plasma density changes due to other causes, such as variation in velocity or angle of attack of the vehicle, for example, such changes are typically sufficiently gradual to be substantially wholly balanced by servo drive 68. Such normal changes in plasma density therefore appear only in very small amplitude at 66. The output indication on line 66 may be enhanced relatively to background noise by providing bandpass filter means tuned to the effective frequency of the desired signal. Such circuit means may be incorporated in the detection circuit represented at 64, or may be included in whatever utilization device is supplied with the signal from line 66.

The operation of maintaining overall balance of the bridge can be aided by utilizing as the impedance Z2 a second pair of plate electrodes, mounted essentially as already described for plates 51 and 52, but offset therefrom. Such reference plates are typically in position to be responsive to a region of the surrounding plasma that is out of the downstream track of the region 30 in which perturbations are magnetically induced. For example, as indicated schematically in FIG. 4, impedance Z2 may comprise the capacitance plates 51a and 52a which are transversely offset from 51 and 52 and which are responsive to a plasma region 30b which substantially excludes region 30a and is transversely offset from the drift track of region 30, indicated schematically at 68. With that arrangement, most changes in plasma density due to other causes than the induced perturbations will affect Z1 and Z2 substantially equally, and will therefore require only a minimum of balancing action by the bridge servo. However, the perturbations induced in region 30 will affect only Z1, and will appear in full at output 66.

To determine the velocity at which the plasma is moving past the vehicle, the signal on line 66 may be supplied to a time discriminating circuit, indicated schematically at 70 in FIG. 1. A reference signal is supplied to circuit 70 via the line 42 from trigger circuit 40. That signal may be coincident with the signal on line 41 which triggers the current pulse in coil 32; or may be delayed relative to that signal by any convenient time interval. Such delay is typically produced by a pulse delay circuit 43 of conventional type, and may, for example, correspond to the time required for the plasma region 30 to move to 30a when the vehicle is moving at some definite predetermined velocity. Timing device 70 effectively measures the time difference between the input signals on lines 42 and 66. That time difference provides a measure of the actual velocity of the plasma past the vehicle, either in absolute terms or relative to the standard velocity corresponding to the described time delay of the reference pulse. For a drift velocity of the plasma of from $10^5$ to $10^6$ cm. per second, for example, and for an axial spacing $d$ between stations of 20 to 100 cm., the time difference has a convenient magnitude for accurate measurement by conventional timing instrumentation. Moreover, the drift time is typically relatively long compared to the pulse duration that can be employed for perturbing the plasma, permitting inherently accurate time determination.

In general, the size of the perturbation tends to increase somewhat with time following its production, due to propagation of the disturbance through the medium. However, by designing the sensing device to be responsive to the peak or to the center of gravity of the perturbation at the sensing station, any error due to such spreading of the region of effective perturbation is of second order. If it is preferred to employ a sensing device responsive to the leading edge of the perturbation, allowance can be made for the fact that the observed velocity is essentially the sum of the propagation velocity and the true drift velocity of the medium.

The drift time of plasma perturbations from 30 to 30a may be determined, alternatively, by phase comparison procedures. For example, perturbing coil 32 in FIG. 1 may be considered to be supplied with a sinusoidally varying current from power source 38 under timed control of oscillating means represented at 40. The output signal on line 66 from discriminator 50 is then typically of sinusoidal form, having a phase difference with respect to the perturbing current that depends upon the travel time of the perturbations from 30 to 30a. Circuit 70 may be considered to represent means responsive to the phase difference between the signal on line 66 and a reference phase signal on line 42. The phase of the latter signal can be adjusted by suitable means, which may be represented at 43, to compensate any lag that is introduced between timer 40 and the perturbation produced in region 30. Phase comparison means of similar type may be supplied with signals from two sensing stations at longitudinally spaced positions to obtain a measure of the drift time between those stations.

Alternatively, as indicated in FIG. 5, plates 51a and 52a which provide the reference impedance Z2 may be positioned directly downstream from plates 51 and 52. Impedances Z1 and Z2 will then respond equally to normal changes in plasma density, as before. However, a plasma perturbation produced in region 30 will first produce an output signal of one sign as it passes the position 30a; and will then produce an output signal of the opposite sign as it passes the position 30c. The time between those two output pulses can be measured by electronic means of known type, for example at 70 in FIG. 1, providing directly a useful measure of the velocity of the plasma in moving from 30a to 30c.

For measuring the angle of attack of a vehicle, in accordance with one form of the invention, two systems for measuring the drift velocity of the plasma are provided on opposite surfaces of the vehicle. The measured difference of drift velocity, for example between dorsal and ventral surfaces, then provides a measure of departure of the vehicle velocity from the axis of symmetry. To obtain both pitch and yaw, two pairs of sensors may be employed, positioned in mutually perpendicular axial planes; or three sensors set at angles of 120° will provide sufficient information for computation of pitch and yaw angles.

In accordance with a further aspect of the invention, the angle of attack may be determined by measuring the direction of the plasma drift velocity in a plane essentially parallel to the vehicle surface. That can be accomplished, for example, by providing at least two sensing devices downstream of a single perturbing station and offset transversely relatively small distances in opposit directions from the normal drift path of the perturbed plasma region. With the perturbing station on one side face of the nose cone, for example, the two sensing devices respond equally to a plasma perturbation at normal or zero angle of attack. If the angle of attack, alpha, is not zero, the path of drift of the perturbation is inclined more toward one of the sensing stations, producing a larger signal in that station. The two sensing stations can utilize two independent pairs of electrode plates, if desired; or can utilize a common central plate as one electrode of each pair.

As indicated schematically in FIG. 6, for example, the perturbing device is shown at 32 on the horizontal midplane of the vehicle. Three sensing plate electrodes are provided at an axially spaced position from 32. Those plates are arranged in a vertical line, with plate 81 on axis 80 and with plates 82 and 83 spaced above and below, respectively. One sensing device 84 responds to the impedance changes between plates 81 and 82, the other sensing device 86 responds to impedance changes between plates 81 and 83. In normal flight, with alpha equal to zero, the perturbed region 30 passes symmetrically over that sensing assembly, as at 30d producing equal signals in the two devices 84 and 86. With positive angle of attack, for example, equal to the angle indicated at 90, the perturbed region of the plasma passes predominantly over the upper sensing device, as at 30e, producing a larger signal in that device and a smaller signal in the lower device. The two output signals from 84 and 86 are typically supplied to a comparison circuit 88, which may be of known type and which discriminates any difference in magnitude of the two signals. For small angles of attack the observed signal difference is directly proportional to alpha. Device 88 may include suitable computing means if desired to take account of any lack of linearity between the observed intensity difference and the angle of attack at larger values.

Alternatively, two transversely spaced perturbing stations can be provided, and pulsed successively. The angle of attack can then be derived from magnitude comparison of the respective responses of a single sensing station located downstream and in symmetrical relation to the perturbing stations for zero angle of attack.

More elaborate arrays employing a larger number of sensing devices may be provided for covering a wider range of angle of attack, and are also capable of providing greater accuracy of determination. Angle of sideslip can be indicated by a similar system placed in the upper or lower surface of the nose section of the vehicle. It will be recognized that a single perturbing station and suitably designed sensing stations can produce signals from which both the magnitude and inclination of the drift velocity can be derived.

FIG. 7 represents schematically an illustrative active sensing system, in contrast to the passive systems of FIGS. 1 to 6. In FIG. 7 a microwave oscillator, such as a klystron, for example, is indicated schematically at 100, supplying output energy via the waveguide 102 to a radiating structure of any suitable type adjacent the vehicle surface 26. That antenna structure is shown illustratively as a horn 104. Electromagnetic radiation of microwave frequency is radiated from the horn 104 into the plasma as a beam 105, with axis 107 transverse of the vehicle surface 26. A portion of that radiation is reflected or scattered back toward antenna 104 by the ions of the plasma in the region defined by beam 105. That reflected radiation travels back up the waveguide 102. A definite proportion of the reflected radiation is taken off by the directional coupler 106 and supplied to the detector 108, typically of conventional type. Detector 108 typically develops a direct current signal on the line 109 which is proportional to the intensity of the reflected radiation. Under uniform operation of oscillator 100, the signal on line 109 then varies in response to changes in ion density in the plasma.

The ion density is perturbed, typically in the manner already described and illustrated in FIG. 1, at a region upstream of the radiation beam 105. The signal on line 109 then exhibits modulation in response to the arrival of the perturbation in front of antenna 104. That signal is supplied to a timing circuit 114, which may be similar to timing circuit 70 of FIG. 1, for computation of the time difference between the signal modulation and a reference signal pulse supplied on line 42. The active system of FIG. 7 has the potential advantage that the radiated beam 105 is reflected primarily where it encounters appreciable gradient of ion density; so that the system typically responds to the condition of the plasma at a somewhat greater distance from the vehicle surface than do the capacitance systems previously described.

Oscillator 100 may be tuned to a definite predetermined frequency; or it may, if desired, be arranged in known manner to scan over a range of frequencies. In the latter case a synchronizing signal is preferably supplied via the line 101 to timing mechanism 114 to indicate the radiated frequency at each instant during the scan. In such manner the drift velocity of the plasma can be measured in terms of whatever wave frequency responds most effectively to the plasma perturbation under the particular existing conditions.

It will be recognized without detailed explanation that a plurality of sensing devices of the type shown in FIG. 7 can be mounted at transversely spaced positions, like the electrode pairs of FIG. 4, for example, and that the intensity difference between the output signals of those two devices will then provide a measure of the angle of attack of the vehicle. The horn 104 or other antenna structure is preferably of such section as to produce a radiation beam that is relatively narrow in section in the direction of plasma drift for sensing the magnitude of the drift velocity, and relatively narrow in the transverse direction for sensing the direction of the plasma drift.

FIG. 8 represents schematically a sensing system responsive to the self-emission of radiofrequency noise from a region 30f of the plasma which is defined by the receiving antenna represented schematically at 115. Antenna 115 supplies the received electromagnetic energy to detecting means 110 via the line 112, which may represent a waveguide. Detector 110 may operate at a predetermined test frequency, or the noise detector can be caused in known manner to scan periodically a definite frequency region. The latter procedure provides increased certainty of detecting any perturbation of the ionized region, since modulation of the noise level at any frequency within the scanned region will be detected.

The output signal from detector 110 on line 119 is preferably passed through suitable filters, represented at 120, to remove the high frequency components that are due primarily to random variations in the noise level. The relatively lower frequency variations due to ion density perturbations induced upstream of region 30f at a perturbing station of the general type already described are then supplied via the line 121 to any desired device 122 for discriminating the time or magnitude of the signals, in the manner already described for sensing systems of other types.

We claim:

1. A system responsive to a flight variable of a vehicle moving through a gaseous medium at a velocity exceeding the velocity of sound, said vehicle producing a shock front in the medium and producing ionization of the medium between the vehicle and the shock front, said system comprising in combination electrical winding means mounted within the vehicle adjacent the vehicle surface and energizable to produce a magnetic field in a first region of the medium between the vehicle surface and the shock front, means for supplying an electrical pulse to the winding means to intermittently modify the distribution of said ionization, and sensing means responsive to the drift velocity of the resulting ion perturbations relative to the vehicle.

2. A system as defined in claim 1, and wherein said sensing means are responsive to the magnitude of the drift velocity of the ion perturbations.

3. A system as defined in claim 1, and wherein said sensing means are responsive to the direction of the drift velocity of the ion perturbations along the vehicle surface.

4. The method of measuring a flight variable of a vehicle moving through a gaseous medium at a velocity exceeding the velocity of sound, at which velocity the vehicle produces a shock front in the medium and produces ionization of the medium between the vehicle and the shock front, said method comprising in combination intermittently and locally electromagnetically redistributing the electric charges existing in said ionized medium in a selected region between the vehicle surface and the shock front to produce local perturbations of the density of the existing ionization in said region, and measuring the drift velocity of said ion perturbations relative to the vehicle.

5. The method of measuring a flight variable of a vehicle moving through a gaseous medium at a velocity exceeding the velocity of sound, at which velocity the vehicle produces a shock front in the medium and produces ionization of the medium between the vehicle and the shock front, said method comprising in combination intermittently and locally electromagnetically redistributing the electric charges existing in said ionized medium in a selected region between the vehicle surface and the shock front to produce local perturbations of the density of the existing ionization in said region, and measuring the magnitude of the drift velocity of said ion perturbations relative to the vehicle.

6. The method of measuring a flight variable of a vehicle moving through a gaseous medium at a velocity exceeding the velocity of sound, at which velocity the vehicle produces a shock front in the medium and produces ionization of the medium between the vehicle and the shock front, said method comprising in combination intermittently and locally electromagnetically redistributing the electric charges existing in said ionized medium in a selected region betwen the vehicle surface and the shock front to produce local perturbations of the density of the existing ionization in said region, and measuring the direction of the drift velocity of said ion perturbations relative to the vehicle.

References Cited by the Examiner

UNITED STATES PATENTS

| 2,699,677 | 1/55 | McCallum | 73—194 |
| 2,716,891 | 9/55 | Stuart | 73—194 |
| 2,827,786 | 3/58 | Boyd | 73—194 |

FOREIGN PATENTS

| 609,661 | 2/35 | Germany. |
| 616,794 | 1/49 | Great Britain. |

ISAAC LISANN, *Primary Examiner.*

LEONARD FORMAN, ROBERT L. EVANS, *Examiners.*